(12) United States Patent
Kropaczek et al.

(10) Patent No.: US 8,582,713 B2
(45) Date of Patent: Nov. 12, 2013

(54) METHOD FOR IMPROVING ENERGY OUTPUT OF A NUCLEAR REACTOR, METHOD FOR DETERMINING NATURAL URANIUM BLANKET LAYER FOR A FUEL BUNDLE, AND A FUEL BUNDLE HAVING A VARIABLE BLANKET LAYER

(75) Inventors: David Joseph Kropaczek, Wilmington, NC (US); John Patrick Rea, Wilmington, NC (US); Mehdi Asgari, Ammon, ID (US)

(73) Assignee: Global Nuclear Fuel-Americas, LLC, Wilmington, NC (US)

( * ) Notice: Subject to any disclaimer, the term of this patent is extended or adjusted under 35 U.S.C. 154(b) by 1353 days.

(21) Appl. No.: 11/589,723

(22) Filed: Oct. 31, 2006

(65) Prior Publication Data
US 2008/0137792 A1    Jun. 12, 2008

(51) Int. Cl.
*G21C 3/00* (2006.01)
(52) U.S. Cl.
USPC .......................................... 376/267; 376/264
(58) Field of Classification Search
USPC .......................................... 376/245, 264, 267
See application file for complete search history.

(56) References Cited

U.S. PATENT DOCUMENTS

| | | | | |
|---|---|---|---|---|
| 3,986,924 A | * | 10/1976 | Motoda | 376/349 |
| 4,285,769 A | * | 8/1981 | Specker et al. | 376/267 |
| 5,198,186 A | * | 3/1993 | Ogiya et al. | 376/435 |
| 5,367,547 A | * | 11/1994 | Hida et al. | 376/435 |
| 5,388,132 A | * | 2/1995 | Aoyama et al. | 376/435 |
| 6,445,759 B1 | * | 9/2002 | Hiraiwa et al. | 376/419 |
| 7,574,337 B2 | * | 8/2009 | Kropaczek et al. | 703/6 |
| 2004/0122632 A1 | * | 6/2004 | Kropaczek et al. | 703/2 |

FOREIGN PATENT DOCUMENTS

| | | | |
|---|---|---|---|
| EP | 1093129 A1 | | 4/2001 |
| EP | 1093129 A1 | * | 4/2001 |
| EP | 1699057 A2 | * | 9/2006 |
| EP | 1699057 A2 | | 9/2006 |
| JP | 61147183 A | * | 7/1986 |
| JP | 61147183 A | | 7/1986 |
| JP | 63-025594 A | | 2/1988 |
| JP | 63025594 A | * | 2/1988 |
| JP | 01-191093 A | | 8/1989 |

(Continued)

OTHER PUBLICATIONS

Japanese Office Action Dated May 29, 2012.*

(Continued)

*Primary Examiner* — Jack W Keith
*Assistant Examiner* — Sean P Burke
(74) *Attorney, Agent, or Firm* — Harness, Dickey & Pierce, P.L.C.

(57) ABSTRACT

In a method for improving the energy generating output of a nuclear reactor containing one or more fuel rods in one or more fuel rod bundles while satisfying a maximum subcritical banked withdrawal position (MSBWP) reactivity limit, enrichments of individual fuel rods in an axial cross-section of a lattice being evaluated at the top of the fuel bundle are ranked, and the fuel pins of the highest ranked rod location in the lattice are replaced with pins containing natural uranium. A core simulation is then performed to determine whether there is any margin to a MSBWP reactivity limit. For each lower ranked candidate rod position, the pin replacing and core simulation functions are repeated until no rod location violates the MSBWP reactivity limit, so as to achieve a desired lattice design for the top of the fuel bundle.

4 Claims, 20 Drawing Sheets

| | A | B | C | D | E | F | G | H | I | J |
|---|---|---|---|---|---|---|---|---|---|---|
| 1 | 0.71 | 0.71 | 0.71 | 0.71 | 0.71 | 0.71 | 0.71 | 0.71 | 0.71 | 0.71 |
| 2 | 0.71 | 0.71 | 0.71 | 0.71 | 0.71 | 0.71 | 0.71 | 0.71 | 0.71 | 0.71 |
| 3 | 0.71 | 0.71 | 0.71 | 0.71 | 0.71 | 0.71 | 0.71 | 0.71 | 0.71 | 0.71 |
| 4 | 0.71 | 0.71 | 0.71 | 0.71 | 0.71 | WR | - | 0.71 | 0.71 | 0.71 |
| 5 | 0.71 | 0.71 | 0.71 | 0.71 | 0.71 | - | - | 0.71 | 0.71 | 0.71 |
| 6 | 0.71 | 0.71 | 0.71 | WR | - | 0.71 | 0.71 | 0.71 | 0.71 | 0.71 |
| 7 | 0.71 | 0.71 | 0.71 | - | - | 0.71 | 0.71 | 0.71 | 0.71 | 0.71 |
| 8 | 0.71 | 0.71 | 0.71 | 0.71 | 0.71 | 0.71 | 0.71 | 0.71 | 0.71 | 0.71 |
| 9 | 0.71 | 0.71 | 0.71 | 0.71 | 0.71 | 0.71 | 0.71 | 0.71 | 0.71 | 0.71 |
| 10 | 0.71 | 0.71 | 0.71 | 0.71 | 0.71 | 0.71 | 0.71 | 0.71 | 0.71 | 0.71 |

(56) References Cited

FOREIGN PATENT DOCUMENTS

| | | | | |
|---|---|---|---|---|
| JP | 01191093 | A | * | 8/1989 |
| JP | 01-250786 | A | | 10/1989 |
| JP | 01250786 | A | * | 10/1989 |
| JP | 05-107388 | A | | 4/1993 |
| JP | 05107388 | A | * | 4/1993 |
| JP | 05-215881 | A | | 8/1993 |
| JP | 05215881 | A | * | 8/1993 |
| JP | 07-270579 | A | | 10/1995 |
| JP | 07270579 | A | * | 10/1995 |
| JP | 08313699 | A | | 11/1996 |
| JP | 08313699 | A | * | 11/1996 |
| JP | 2001-116875 | A | | 4/2001 |
| JP | 2001116875 | A | * | 4/2001 |
| JP | 2004-170472 | A | | 6/2004 |
| JP | 2004170472 | A | * | 6/2004 |
| JP | 2006189439 | A | | 7/2006 |
| JP | 2006189439 | A | * | 7/2006 |

OTHER PUBLICATIONS

European Search Report Dated Jun. 24, 2010.*
European Search Report dated Jun. 24, 2010 for EP Application No. 07 11 9447.6.
Japanese Office Action dated May 29, 2012 for corresponding Japanese Application No. 2007-274559 (Full English language translation provided).

* cited by examiner

|   | A | B | C | D | E | F | G | H | I | J |
|---|---|---|---|---|---|---|---|---|---|---|
| 1 | 0.71 | 0.71 | 0.71 | 0.71 | 0.71 | 0.71 | 0.71 | 0.71 | 0.71 | 0.71 |
| 2 | 0.71 | 0.71 | 0.71 | 0.71 | 0.71 | 0.71 | 0.71 | 0.71 | 0.71 | 0.71 |
| 3 | 0.71 | 0.71 | 0.71 | 0.71 | 0.71 | 0.71 | 0.71 | 0.71 | 0.71 | 0.71 |
| 4 | 0.71 | 0.71 | 0.71 | 0.71 | 0.71 | WR | - | 0.71 | 0.71 | 0.71 |
| 5 | 0.71 | 0.71 | 0.71 | 0.71 | 0.71 | - | - | 0.71 | 0.71 | 0.71 |
| 6 | 0.71 | 0.71 | 0.71 | WR | - | 0.71 | 0.71 | 0.71 | 0.71 | 0.71 |
| 7 | 0.71 | 0.71 | 0.71 | - | - | 0.71 | 0.71 | 0.71 | 0.71 | 0.71 |
| 8 | 0.71 | 0.71 | 0.71 | 0.71 | 0.71 | 0.71 | 0.71 | 0.71 | 0.71 | 0.71 |
| 9 | 0.71 | 0.71 | 0.71 | 0.71 | 0.71 | 0.71 | 0.71 | 0.71 | 0.71 | 0.71 |
| 10 | 0.71 | 0.71 | 0.71 | 0.71 | 0.71 | 0.71 | 0.71 | 0.71 | 0.71 | 0.71 |

FIG. 5

|   | A | B | C | D | E | F | G | H | I | J |
|---|---|---|---|---|---|---|---|---|---|---|
| 1 | 1.60 | 2.40 | 2.80 | 3.60 | 3.95 | 3.95 | 3.95 | 3.95 | 3.60 | 2.80 |
| 2 | 2.40 | 3.20 | 3.20 | 3.95 | 4.40 | 4.40 | 4.90 | 4.90 / 7.00 | 4.90 | 3.60 |
| 3 | 2.80 | 3.20 | 4.40 | 4.40 | 4.90 / 7.00 | 4.90 | 4.90 | 4.90 | 4.90 / 7.00 | 4.40 |
| 4 | 3.60 | 3.95 | 4.40 | 4.90 / 7.00 | 4.90 | WR | - | 4.90 | 4.90 | 4.40 |
| 5 | 3.95 | 4.40 | 4.90 / 7.00 | 4.90 | 4.90 | - | - | 4.90 | 4.90 / 8.00 | 4.90 |
| 6 | 3.95 | 4.40 | 4.90 | WR | - | 4.90 | 4.90 | 4.90 / 8.00 | 4.90 | 4.90 |
| 7 | 3.95 | 4.90 | 4.90 | - | - | 4.90 | 4.90 / 8.00 | 4.90 | 4.90 | 4.90 |
| 8 | 3.95 | 4.90 / 7.00 | 4.90 | 4.90 | 4.90 | 4.90 / 8.00 | 4.90 | 4.90 | 4.90 / 8.00 | 4.40 |
| 9 | 3.60 | 4.90 | 4.90 / 7.00 | 4.90 | 4.90 / 8.00 | 4.90 | 4.90 | 4.90 / 8.00 | 4.90 | 3.60 |
| 10 | 2.80 | 3.60 | 4.40 | 4.40 | 4.90 | 4.90 | 4.90 | 4.40 | 3.60 | 2.80 |

FIG. 6

|   | A | B | C | D | E | F | G | H | I | J |
|---|---|---|---|---|---|---|---|---|---|---|
| 1 | 1.60 | 2.40 | 2.80 | 3.60 | 3.95 | 3.95 | 3.95 | 3.95 | 3.60 | 2.80 |
| 2 | 2.40 | 3.20 | 3.20 | 3.95 | 4.40 | 4.40 | 4.90 | 4.90 / 7.00 | 4.90 | 3.60 |
| 3 | 2.80 | 3.20 | 4.40 / 7.00 | 4.40 | 4.90 / 7.00 | 4.90 | 4.90 | 4.90 | 4.90 / 7.00 | 4.40 |
| 4 | 3.60 | 3.95 | 4.40 | 4.90 / 7.00 | 4.90 | WR | - | 4.90 | 4.90 | 4.40 |
| 5 | 3.95 | 4.40 | 4.90 / 7.00 | 4.90 | 4.90 | - | - | 4.90 | 4.90 / 8.00 | 4.90 |
| 6 | 3.95 | 4.90 | 4.90 | WR | - | 4.90 | 4.90 | 4.90 / 8.00 | 4.90 | 4.90 |
| 7 | 3.95 | 4.90 | 4.90 | - | - | 4.90 | 4.90 / 8.00 | 4.90 | 4.90 | 4.90 |
| 8 | 3.95 | 4.90 / 7.00 | 4.90 | 4.90 | 4.90 | 4.90 / 8.00 | 4.90 | 4.90 | 4.90 / 8.00 | 4.40 |
| 9 | 3.60 | 4.90 | 4.90 / 7.00 | 4.90 | 4.90 / 8.00 | 4.90 | 4.90 | 4.90 / 8.00 | 4.90 | 3.60 |
| 10 | 2.80 | 3.60 | 4.40 | 4.40 | 4.90 | 4.90 | 4.90 | 4.40 | 3.60 | 2.80 |

FIG. 7

|   | A | B | C | D | E | F | G | H | I | J |
|---|---|---|---|---|---|---|---|---|---|---|
| 1 | 1.60 | 2.40 | 2.80 | 3.60 | 3.95 | 3.95 | 3.95 | 3.95 | 3.60 | 2.80 |
| 2 | 2.40 | E | 3.20 | E | 4.40 | 4.40 | E | 4.90 | E | 3.60 |
| 3 | 2.80 | 3.20 | 4.40 / 8.00 | 4.40 | 4.40 / 8.00 | 4.90 | 4.90 | 4.90 | 4.40 / 8.00 | 4.40 |
| 4 | 3.60 | E | 4.40 | 4.40 / 8.00 | 4.90 | WR | - | 4.90 | E | 4.40 |
| 5 | 3.95 | 4.40 | 4.40 / 8.00 | 4.90 | E | - | - | 4.90 | 4.90 / 8.00 | 4.90 |
| 6 | 3.95 | 4.40 | 4.90 | WR | - | E | 4.90 | 4.90 / 8.00 | 4.90 | 4.90 |
| 7 | 3.95 | E | 4.90 | - | - | 4.90 | 4.90 / 8.00 | 4.90 | E | 4.90 |
| 8 | 3.95 | 4.90 | 4.90 | 4.90 | 4.90 | 4.90 / 8.00 | 4.90 | 4.90 | 4.90 / 8.00 | 4.40 |
| 9 | 3.60 | E | 4.40 / 8.00 | E | 4.90 / 8.00 | 4.90 | E | 4.90 / 8.00 | E | 3.60 |
| 10 | 2.80 | 3.60 | 4.40 | 4.40 | 4.90 | 4.90 | 4.90 | 4.40 | 3.60 | 2.80 |

FIG. 8

|   | A | B | C | D | E | F | G | H | I | J |
|---|---|---|---|---|---|---|---|---|---|---|
| 1 | 1.60 | 2.40 | 2.80 | 3.60 | 3.95 | 3.95 | 3.95 | 3.95 | 3.60 | 2.80 |
| 2 | 2.40 | V | 3.20 | V | 4.40 | 4.40 | V | 4.90 | V | 3.60 |
| 3 | 2.80 | 3.20 | 4.40 8.00 | 4.40 | 4.40 8.00 | 4.90 | 4.90 | 4.90 | 4.40 8.00 | 4.40 |
| 4 | 3.60 | V | 4.40 | 4.40 8.00 | 4.90 | WR | - | 4.90 | V | 4.40 |
| 5 | 3.95 | 4.40 | 4.40 8.00 | 4.90 | V | - | - | 4.90 | 4.90 8.00 | 4.90 |
| 6 | 3.95 | 4.40 | 4.90 | WR | - | V | 4.90 | 4.90 8.00 | 4.90 | 4.90 |
| 7 | 3.95 | V | 4.90 | - | - | 4.90 | 4.90 8.00 | 4.90 | V | 4.90 |
| 8 | 3.95 | 4.90 | 4.90 | 4.90 | 4.90 | 4.90 8.00 | 4.90 | 4.90 | 4.90 8.00 | 4.40 |
| 9 | 3.60 | V | 4.40 8.00 | V | 4.90 8.00 | 4.90 | V | 4.90 8.00 | V | 3.60 |
| 10 | 2.80 | 3.60 | 4.40 | 4.40 | 4.90 | 4.90 | 4.90 | 4.40 | 3.60 | 2.80 |

FIG. 9

|   | A | B | C | D | E | F | G | H | I | J |
|---|---|---|---|---|---|---|---|---|---|---|
| 1 | 0.71 | 0.71 | 0.71 | 0.71 | 0.71 | 0.71 | 0.71 | 0.71 | 0.71 | 0.71 |
| 2 | 0.71 | V | 0.71 | V | 0.71 | 0.71 | V | 4.90 | V | 3.60 |
| 3 | 0.71 | 0.71 | 4.40 / 8.00 | 4.40 | 4.40 / 8.00 | 4.90 | 4.90 | 4.90 | 4.40 / 8.00 | 4.40 |
| 4 | 0.71 | V | 4.40 | 4.40 / 8.00 | 4.90 | WR | - | 4.90 | V | 4.40 |
| 5 | 0.71 | 0.71 | 4.40 / 8.00 | 4.90 | V | - | - | 4.90 | 4.90 / 8.00 | 4.90 |
| 6 | 0.71 | 0.71 | 4.90 | WR | - | V | 4.90 | 4.90 / 8.00 | 4.90 | 4.90 |
| 7 | 0.71 | V | 4.90 | - | - | 4.90 | 4.90 / 8.00 | 4.90 | V | 4.90 |
| 8 | 0.71 | 4.90 | 4.90 | 4.90 | 4.90 | 4.90 / 8.00 | 4.90 | 4.90 | 4.90 / 8.00 | 4.40 |
| 9 | 0.71 | V | 4.40 / 8.00 | V | 4.90 / 8.00 | 4.90 | V | 4.90 / 8.00 | V | 3.60 |
| 10 | 0.71 | 3.60 | 4.40 | 4.40 | 4.90 | 4.90 | 4.90 | 4.40 | 3.60 | 2.80 |

FIG. 10

|   | A | B | C | D | E | F | G | H | I | J |
|---|---|---|---|---|---|---|---|---|---|---|
| 1 | 0.71 | 0.71 | 0.71 | 0.71 | 0.71 | 0.71 | 0.71 | 0.71 | 0.71 | 0.71 |
| 2 | 0.71 | V | 0.71 | V | 0.71 | 0.71 | V | E | V | 0.71 |
| 3 | 0.71 | 0.71 | E | 0.71 | E | 0.71 | 0.71 | 0.71 | E | 0.71 |
| 4 | 0.71 | V | 0.71 | E | 0.71 | WR | - | 0.71 | V | 0.71 |
| 5 | 0.71 | 0.71 | E | 0.71 | V | - | - | 0.71 | E | 0.71 |
| 6 | 0.71 | 0.71 | 0.71 | WR | - | V | 0.71 | E | 0.71 | 0.71 |
| 7 | 0.71 | V | 0.71 | - | - | 0.71 | E | 0.71 | V | 0.71 |
| 8 | 0.71 | E | 0.71 | 0.71 | 0.71 | E | 0.71 | 0.71 | E | 0.71 |
| 9 | 0.71 | V | E | V | E | 0.71 | V | E | V | 0.71 |
| 10 | 0.71 | 0.71 | 0.71 | 0.71 | 0.71 | 0.71 | 0.71 | 0.71 | 0.71 | 0.71 |

FIG. 11

|   | A | B | C | D | E | F | G | H | I | J |
|---|---|---|---|---|---|---|---|---|---|---|
| 1 | 0.71 | 0.71 | 0.71 | 0.71 | 0.71 | 0.71 | 0.71 | 0.71 | 0.71 | 0.71 |
| 2 | 0.71 | V | 0.71 | V | 0.71 | 0.71 | V | 0.71 | V | 0.71 |
| 3 | 0.71 | 0.71 | 0.71 | 0.71 | 0.71 | 0.71 | 0.71 | 0.71 | 0.71 | 0.71 |
| 4 | 0.71 | V | 0.71 | 0.71 | 0.71 | WR | - | 0.71 | V | 0.71 |
| 5 | 0.71 | 0.71 | 0.71 | 0.71 | V | - | - | 0.71 | 0.71 | 0.71 |
| 6 | 0.71 | 0.71 | 0.71 | WR | - | V | 0.71 | 0.71 | 0.71 | 0.71 |
| 7 | 0.71 | V | 0.71 | - | - | 0.71 | 0.71 | 0.71 | V | 0.71 |
| 8 | 0.71 | 0.71 | 0.71 | 0.71 | 0.71 | 0.71 | 0.71 | 0.71 | 0.71 | 0.71 |
| 9 | 0.71 | V | 0.71 | V | 0.71 | 0.71 | V | 0.71 | V | 0.71 |
| 10 | 0.71 | 0.71 | 0.71 | 0.71 | 0.71 | 0.71 | 0.71 | 0.71 | 0.71 | 0.71 |

FIG. 12

|   | A | B | C | D | E | F | G | H | I | J |
|---|---|---|---|---|---|---|---|---|---|---|
| 1 | 0.71 | 0.71 | 0.71 | 0.71 | 0.71 | 0.71 | 0.71 | 0.71 | 0.71 | 0.71 |
| 2 | 0.71 | V | 0.71 | V | 0.71 | 0.71 | V | 4.90 | V | 3.60 |
| 3 | 0.71 | 0.71 | 4.40 / 8.00 | 4.40 | 4.40 / 8.00 | 4.90 | 4.90 | 4.90 | 4.40 / 8.00 | 4.40 |
| 4 | 0.71 | V | 4.40 | 4.40 / 8.00 | 4.90 | WR | - | 4.90 | V | 4.40 |
| 5 | 0.71 | 0.71 | 4.40 / 8.00 | 4.90 | V | - | - | 4.90 | 4.90 / 8.00 | 4.90 |
| 6 | 0.71 | 0.71 | 4.90 | WR | - | V | 4.90 | 4.90 / 8.00 | 4.90 | 4.90 |
| 7 | 0.71 | V | 4.90 | - | - | 4.90 | 4.90 / 8.00 | 4.90 | V | 4.90 |
| 8 | 0.71 | 4.90 | 4.90 | 4.90 | 4.90 | 4.90 / 8.00 | 4.90 | 4.90 | 4.90 / 8.00 | 4.40 |
| 9 | 0.71 | V | 4.40 / 8.00 | V | 4.90 / 8.00 | 4.90 | V | 4.90 / 8.00 | V | 3.60 |
| 10 | 0.71 | 3.60 | 4.40 | 4.40 | 4.90 | 4.90 | 4.90 | 4.40 | 3.60 | 2.80 |

FIG. 13

|   | A | B | C | D | E | F | G | H | I | J |
|---|---|---|---|---|---|---|---|---|---|---|
| 1 | 0.71 | 0.71 | 0.71 | 0.71 | 3.95 | 3.95 | 3.95 | 3.95 | 0.71 | 0.71 |
| 2 | 0.71 | V | 0.71 | V | 4.40 | 4.40 | V | 4.90 | V | 0.71 |
| 3 | 0.71 | 0.71 | 4.40 8.00 | 4.40 | 4.40 8.00 | 4.90 | 4.90 | 4.90 | 4.40 8.00 | 4.40 |
| 4 | 0.71 | V | 4.40 | 4.40 8.00 | 4.90 | WR | - | 4.90 | V | 4.40 |
| 5 | 3.95 | 4.40 | 4.40 8.00 | 4.90 | V |   | - | 4.90 | 4.90 8.00 | 4.90 |
| 6 | 3.95 | 4.40 | 4.90 | WR | - | V | 4.90 | 4.90 8.00 | 4.90 | 4.90 |
| 7 | 3.95 | V | 4.90 | - | - | 4.90 | 4.90 8.00 | 4.90 | V | 4.90 |
| 8 | 3.95 | 4.90 | 4.90 | 4.90 | 4.90 | 4.90 8.00 | 4.90 | 4.90 | 4.90 8.00 | 4.40 |
| 9 | 0.71 | V | 4.40 8.00 | V | 4.90 8.00 | 4.90 | V | 4.90 8.00 | V | 0.71 |
| 10 | 0.71 | 0.71 | 4.40 | 4.40 | 4.90 | 4.90 | 4.90 | 4.40 | 0.71 | 0.71 |

FIG. 14

|   | A | B | C | D | E | F | G | H | I | J |
|---|---|---|---|---|---|---|---|---|---|---|
| 1 | 1.60 | 2.40 | 2.80 | 3.60 | 3.95 | 3.95 | 3.95 | 3.95 | 3.60 | 2.80 |
| 2 | 2.40 | V | 3.20 | V | 4.40 | 4.40 | V | 4.90 | V | 3.60 |
| 3 | 2.80 | 3.20 | 4.40 / 8.00 | 4.40 | 4.40 / 8.00 | 4.90 | 4.90 | 4.90 | 4.40 / 8.00 | 4.40 |
| 4 | 3.60 | V | 4.40 | 4.40 / 8.00 | 4.90 | WR | - | 4.90 | V | 4.40 |
| 5 | 3.95 | 4.40 | 4.40 / 8.00 | 4.90 | V | - | - | 4.90 | 4.90 / 8.00 | 4.90 |
| 6 | 3.95 | 4.40 | 4.90 | WR | - | V | 4.90 | 4.90 / 8.00 | 4.90 | 4.90 |
| 7 | 3.95 | V | 4.90 | - | - | 4.90 | 4.90 / 8.00 | 4.90 | V | 4.90 |
| 8 | 3.95 | 4.90 | 4.90 | 4.90 | 4.90 | 4.90 / 8.00 | 4.90 | 4.90 | 4.90 / 8.00 | 4.40 |
| 9 | 3.60 | V | 4.40 / 8.00 | V | 4.90 / 8.00 | 4.90 | V | 4.90 / 8.00 | V | 3.60 |
| 10 | 2.80 | 3.60 | 4.40 | 4.40 | 4.90 | 4.90 | 4.90 | 4.40 | 3.60 | 2.80 |

FIG. 15

METHOD FOR IMPROVING ENERGY OUTPUT OF A NUCLEAR REACTOR, METHOD FOR DETERMINING NATURAL URANIUM BLANKET LAYER FOR A FUEL BUNDLE, AND A FUEL BUNDLE HAVING A VARIABLE BLANKET LAYER

BACKGROUND OF THE INVENTION

1. Field of the Invention

Example embodiment(s) of the present invention are directed to methods of improving the energy output of a nuclear reactor, while satisfying a minimum subcritical bank withdrawal position (MSBWP) safety condition, to a method for determining fuel rods to be subject to an extended natural uranium blanket layer, so as to employ a variable natural blanket for selectable fuel rods in one or more fuel bundle(s) of the reactor, and to a fuel bundle which has a variable natural uranium blanket.

2. Description of the Related Art

FIG. 1 illustrates a conventional boiling water reactor (BWR); FIG. 2 illustrates a fuel bundle in the core of a reactor vessel; and FIG. 3 represents an x-y map distribution of a 10×10 array of fuel rods and water rods in a fuel bundle located in one quadrant of a control blade.

As show in FIG. 1, a pump 110 supplies water via a conduit (e.g., in the direction of arrow from pump 110 towards the containment vessel 114) to a reactor vessel 112 housed within the containment vessel 114. The core of the reactor vessel includes a number of fuel bundles B at locations. Controlled nuclear fission takes place at the fuel bundles (e.g., fuel bundles B of FIG. 2) in the core and generates heat which turns the supplied water (not shown)—flowing between fuel rods—into steam.

Referring to FIG. 1, steam (not shown) is supplied from the reactor vessel 112 to turbines 118 for powering a power generator 120, which in turn outputs electrical energy. The steam supplied to the turbines 118 is condensed back into water at condenser 122. The water from the condensed steam is recycled back to pump 110. The above process repeats itself (for a number of cycles) to generate electricity from the BWR.

A typical core of the reactor vessel may contain anywhere from about 200 to about 900 of fuel bundles B. Of course, different configurations as well as different numbers of fuel bundles may be used, so long as such configurations satisfy the safety and energy output requirements of a nuclear reactor. As shown in FIG. 2, a given fuel bundle B includes an outer channel C surrounding a plurality of fuel rods 100 extending generally parallel to one another between an upper plate U and a lower tie plate L. In general, the fuel rods 100 are provided in a generally rectilinear matrix as illustrated in FIG. 3.

The fuel rods 100 are maintained laterally spaced from one another by a plurality of spacers S which are vertically separated from one other along the length of the fuel rods 100 within the channel C. FIG. 3 illustrates a 10×10 array of fuel rods 100 surrounded by the fuel channel C. The fuel rods 100 are arranged in orthogonally related rows to surround one or more water rods 130, with two water rods 130 shown in FIG. 3. Other configurations may be used. Reactor coolant (other than the water in the water rods) flows between fuel rods 100 and collects the heat generated from nuclear reactions occurring within the fuel rod(s) of the fuel bundle(s).

In FIG. 3, a given fuel bundle B is arranged in one quadrant of a cruciform control blade 132 (e.g., only one of four quadrants is shown in this example); a cruciform control blade is a conventionally-known control blade configuration for a BWR. A given fuel bundle B is typically arranged in each of the other three quadrants of the control blade 132, as is known. Movement of control blade(s) 132 up (and down) between the bundles B controls the amount of nuclear reactivity occurring in the bundles B. FIGS. 1-3 illustrate just one conventional arrangement of rods 100 within a bundle of a reactor core of a BWR; other arrangements may be used as is evident to one skilled in the art.

In a given fuel rod 100, the fuel rod 100 is typically filled along various locations within its vertical span in a bundle with uranium (e.g., pellets containing the isotopes $^{238}$U and $^{235}$U), where the amount of $^{235}$U may be enriched (as desired) to account for safe operating conditions in a nuclear reactor. The isotope $^{235}$U is naturally found in uranium at a concentration of 0.711% (by weight) with the remainder of the uranium being the isotope $^{238}$U. Accordingly, as used hereafter, 0.71 represents the concentration of natural uranium.

After going through a process of enriching, the enriched uranium may contain from about 2% (or just above 2% by weight) to about 5% (by weight) $^{235}$U with the remainder of the uranium being isotope $^{238}$U. Although amounts greater than about 5% (by weight) of $^{235}$U in enriched uranium could be used, commercial power-producing nuclear reactors have traditionally been limited to 5% enriched uranium fuels.

As discussed above, fuel rod 100 may be filled with pellets of natural uranium in some parts of rod 100 and pellets of enriched uranium in other parts of rod 100, along the vertical (axial) height of the fuel rod 100. Some of the pellets may contain only natural uranium while other pellets may contain a combination of natural uranium and enriched uranium. Additionally, some pellets may contain only enriched uranium (a concentration of $^{235}$U above that found in natural uranium, i.e., >0.71). Typically, the uranium pellets may be about a half inch in height.

A typical fuel rod may 100 contain up to about 240 pellets. Also, in some parts, the fuel rod 100 may contain no pellets providing a void space (designated as V as further described herein) or the fuel rod 100 may have a truncated height (designated as E as further described herein). Thus, given fuel rod(s) 100 may be shorter than other fuel rods within a given fuel rod bundle B.

FIG. 4 is a representation of various axial sections of a given fuel rod 100. With reference to bundle B in FIGS. 2 and 3, the 10×10 array of fuel rods 100 and water rods 130 can be represented by a x-y map distribution (or radial lattice) cutting across a (e.g., horizontal) cross-section of fuel bundle B. In FIG. 4, a typical fuel rod 100 has a height of about 150 inches. FIG. 4 illustrates seven x-y map distributions along the vertical height of a rod 100, from 0 to 150 inches. Each 6-inch segment of a fuel rod 100 may be referred to as a node; thus there are 25 nodes in a 150 inch rod, with node 1 representing the bottom 6 inches of rod 100 and node 25 representing the segment between 144 to 150 inches of fuel rod 100 from its bottom.

These x-y map distributions, starting from the bottom of the fuel rod 100, are identified in FIG. 4 as the following:

(a) 26868 (extending from height=0 inches to 6 inches, node 1);

(b) 26869 (extending from height=6 inches to 54 inches, nodes 2 to 9);

(c) 26870 (extending from height=54 inches to 84 inches, nodes 10 to 14);

(d) 26871 (extending from height=84 inches to 96 inches, nodes 15 and 16);

(e) 26872 (extending from height=96 inches to 138 inches, nodes 17 to 23);

(f) 26873 (extending from height=138 inches to 144 inches, node 24); and (g) 26874 (extending from height=144 inches to 150 inches, node 25).

FIGS. 5-11 illustrate x-y map distributions corresponding to (a) through (g) above for all fuel rods 100 of a given fuel rod bundle B at each of the seven specified locations between 0 to 150 inches of fuel rod height. The x-y map distributions of FIGS. 5-11 should be read in conjunction with FIG. 4. In FIGS. 5-11, a cell (fuel rod) with a "V" indicates that a fuel rod 100 does not exist at all at the cell position depicted in the corresponding x-y map distribution, and an "E" indicates that while the shell of a fuel rod 100 is present, the shell (of fuel rod 100) is empty at the corresponding cell position depicted in the corresponding x-y map distribution. FIGS. 5-11 should be referred to for the following discussion.

FIG. 5 illustrates the x-y map distribution (e.g., 26868) for all fuel rods of a given fuel rod bundle at a location between height=0 to 6 inches. In FIG. 5, the number "0.71" reflects the concentration (in percent by weight) of the amount of $^{235}U$ present in the fuel rod at the corresponding cell position (A1-J10) between height=0 inches and 6 inches, or in other words, rods 100 at that location or node (node 1) which have natural uranium. In FIG. 5, the cells D6, D7, E6 and E7 constitute a water rod (WR) corresponding to the circle identified as 130 in FIG. 3, with the second water rod 130 of FIG. 3 denoted by cells F4, F5, G4 and G5.

As all fuel rods 100 at node 1 (0 to 6 inches from bottom) have a natural uranium concentration at that location, the x-y map distribution of FIG. 5 thus shows the formation of an all "natural" blanket layer at the bottom of the all fuel rods in a given bundle B at node 1. This 6-inch natural blanket at the bottom of a fuel bundle B is provided to help ensure safe nuclear reactor operation within specified safety and/or operating limits. FIGS. 6-9 show x-y map distributions corresponding to positions or nodes indicated in (b) through (e) above, and are provided merely for comparative reference.

FIG. 10 is an x-y map distribution (e.g., 26873) of the composition of a fuel rod bundle at a location between height=138 (or >138) to 144 inches; and FIG. 11 is an x-y map distribution (e.g., 26874) of the composition of a fuel rod bundle at a location between height=144 (or >144) to 150 inches. Conventionally in a BWR, another all "natural" blanket layer is provided at the top of the fuel rods 100 within a given bundle B at a height between 138 and 150 inches as reflected in FIGS. 10 and 11 (x-y map distributions 26873 and 26874). This 12-inch natural blanket at nodes 24 and 25 is also typically provided to ensure safe nuclear reactor operation within specified safety limits.

The use of a natural blanket at the bottom node 1 (6 inches of natural uranium) and at the top nodes (either a 6 inch blanket at node 25 (top) or a 12-inch blanket at nodes 24 and 25) is the conventional design choice for plant designers. The use of these natural blankets allows an overall reduction in bundle enrichment by reducing neutron leakage from the top and bottom of the core. Yet the larger 12-inch blanket at the top results in an effectively shorter fuel bundle, which can reduce thermal margins in non-peripheral portions of the core and hence lower thermal output.

Moreover, in addition to being able to satisfy limits for thermal parameters such as MFLPD (Maximum Fraction of Limiting Power Density), MAPRAT (the ratio of MAPLHGR or Maximum Average Planar Linear Heat Generation compared to its limit), MFLCPR (Maximum Fraction of Limiting Critical Power Ratio), and limits for reactivity parameters (cold shutdown margin (CSDM) and hot excess reactivity (HOTX)), use of the larger 12-inch blanket may complicate satisfying the limit or condition for the reactivity parameter known as the maximum subcritical banked withdrawal position (MSBWP).

BRIEF DESCRIPTION OF THE INVENTION

An example embodiment of the present invention is directed to a method for improving the energy generating output of a nuclear reactor containing one or more fuel rods in one or more fuel rod bundles while satisfying a maximum subcritical banked withdrawal position (MSBWP) reactivity limit. In the method, enrichments of individual fuel rods in an axial cross-section of a lattice being evaluated at the top of the fuel bundle are ranked, and the fuel pins of the highest ranked rod location in the lattice are replaced with pins containing natural uranium. A core simulation is then performed to determine whether there is any margin to a MSBWP reactivity limit. For each lower ranked candidate rod position, the pin replacing and core simulation functions are repeated until no rod location violates the MSBWP reactivity limit, so as to achieve a desired lattice design for the top of the fuel bundle.

Another example embodiment is directed to a method of determining a natural uranium blanket layer for a fuel bundle in a nuclear reactor. The method includes evaluating rod enrichments in all fuel rod locations in the bundle at an axial location that represents a cross-section of the top six inches of the bundle. A 6-inch blanket of natural uranium is provided in rod locations which have an enrichment exceeding a rod enrichment concentration threshold. Otherwise, a 12-inch blanket of natural uranium is provided in rod locations which have an enrichment less than or equal to the rod enrichment concentration threshold.

Another example embodiment is directed to a fuel bundle of a nuclear reactor. The fuel bundle includes a six-inch natural uranium blanket layer at a bottom end of the bundle. In the bundle, one or more selectable rod locations at an axial cross-section at the top end of the bundle with fuel rod enrichments there at exceeding a rod enrichment threshold value have a six-inch natural uranium blanket layer therein. One or more selectable rod locations in the axial cross-section which have fuel rod enrichments less than or equal to the rod enrichment threshold value have a twelve-inch natural uranium blanket layer therein.

BRIEF DESCRIPTION OF THE DRAWINGS

Example embodiments of the present invention will be more clearly understood from the detailed description taken in conjunction with the accompanying drawings/figures. The drawings/figures provided herein are for illustrative purposes only. They illustrate various non-limiting aspects of various embodiment(s) of the invention. Other variations may be possible. Also, as the figures/drawings are provided for illustrative purposes, they may not be drawn to scale. Further, various drawings/figures may show optional equipment which is by definition not required for practicing the present invention.

FIG. 5 is an x-y map distribution (e.g., 26868) of the composition of a fuel rod bundle at a location between height=0 to 6 inches.

FIG. 6 is an x-y map distribution (e.g., 26869) of the composition of a fuel rod bundle at a location between height=6 (or >6) to 54 inches.

FIG. 7 is an x-y map distribution (e.g., 26870) of the composition of a fuel rod bundle at a location between height=54 (or >54) to 84 inches.

FIG. 8 is an x-y map distribution (e.g., 26871) of the composition of a fuel rod bundle at a location between height=84 (or >84) to 96 inches.

FIG. 9 is an x-y map distribution (e.g., 26872) of the composition of a fuel rod bundle at a location between height=96 (or >96) to 138 inches.

FIG. 10 is an x-y map distribution (e.g., 26873) of the composition of a fuel rod bundle at a location between height=138 (or >138) to 144 inches.

FIG. 11 is an x-y map distribution (e.g., 26874) of the composition of a fuel rod bundle at a location between height=144 (or >144) to 150 inches.

FIG. 12 is an x-y map distribution (e.g., 72017) of the lattice cross-section of a fuel rod bundle at a location between height=138 (or >138) to 144 inches, in which all rods of the fuel bundle at this axial location (node 24) have a natural uranium concentration of 0.71.

FIG. 13 is an x-y map distribution (e.g., 70017) of the lattice cross-section of a fuel rod bundle at a location between height=138 (or >138) to 144 inches, in which 33% of the bundle at this node 24 is natural uranium, the remainder enriched uranium.

FIG. 14 is an x-y map distribution (e.g., 73017) of the lattice cross-section of a fuel rod bundle at a location between height=138 (or >138) to 144 inches, in which 24% of the bundle at this node 24 is natural uranium, the remainder enriched uranium.

FIG. 15 is another x-y map distribution (e.g., 75017) of the lattice cross-section of a fuel rod bundle at a location between height=138 (or >138) to 144 inches, in which 0% of the bundle at this location is natural uranium; this represents a fully enriched uranium node.

DETAILED DESCRIPTION OF EXAMPLE EMBODIMENTS

In an example embodiment to be described in detail hereafter, there is described a method of improving the energy generating output of a nuclear reactor while satisfying the MSBWP reactivity limit.

As will be seen below, certain example embodiments are directed to a method of identifying and/or enriching selected fuel rods in the $2^{nd}$ top most six inches of nuclear reactor fuel bundles (e.g., between height=138 to 144 inches) with $^{235}U$ which satisfies the MSBWP reactivity limit/constraint or safety condition. Other variations are possible within the scope of the present invention. For example, instead of $^{235}U$, another fissionable fuel may be used as appropriate. Other variations are also contemplated to be within the scope of the present invention as are recognized by those of ordinary skill in the art.

An aspect of the present invention relates to the design of fresh fuel bundles which satisfy the MSBWP reactivity limit criteria/safety condition and also improve the energy output of a nuclear reactor. To appreciate various aspects of the present invention and for explanation of the various lattice designs shown in the figures, reference is made to FIG. 6.

Figure 4:
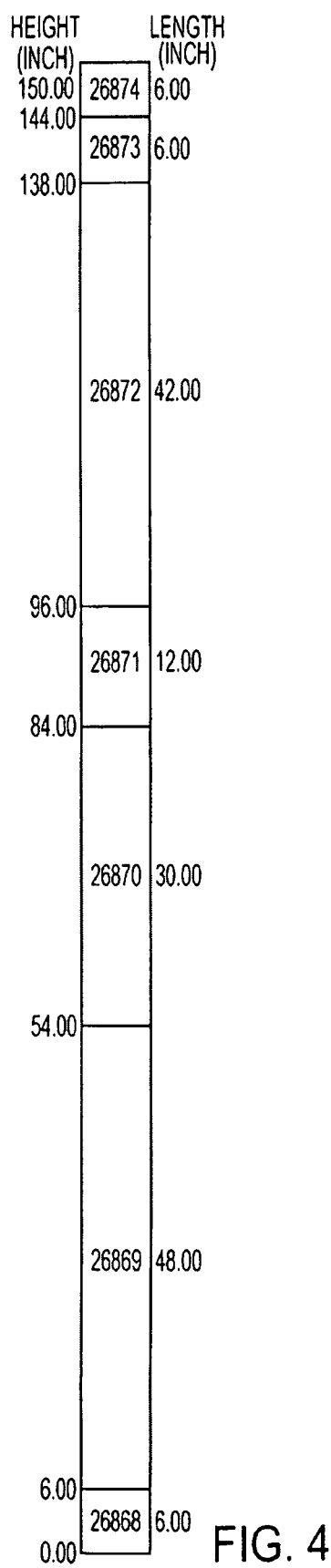
FIG. 4 is a representation of various axial sections of a fuel rod.

FIG. 6 is an x-y map distribution (e.g., 26869) of the composition of a fuel rod bundle at a location between height=6 (or >6) to 54 inches. This corresponds to the nodes between 6 and 54' in the fuel rod 100 shown in FIG. 4. In FIG. 6, each of the cells in the lattice design (A1 to J10) contain an amount of $^{235}U$ (in terms of percent by weight) reflected by the particular percent by weight value recited in each relevant cell position. Thus, for example, cell A1 of FIG. 6 is marked with the number 1.60. This means that between height=6 inches to 54 inches (consistent with the height or axial location of map distribution 26869 in FIG. 4), the fuel rod 100 contains 1.60% (by weight) of $^{235}U$. In other words, reading x-y map 26869 (of FIG. 6) in conjunction with FIG. 4 indicates exactly where in the fuel rod 100 one will find 1.60% by weight of $^{235}U$.

Likewise, referring to cell D3 of FIG. 6, the amount of $^{235}U$ is 4.40% by weight. At cell D4 of FIG. 6, however, two numbers are listed. The upper number reflects the amount of $^{235}U$ present (e.g., 4.90% by weight) and the lower number reflects the amount of gadolinium present (e.g., 7.00% by weight). Gadolinium acts to slow down nuclear reactions by absorbing neutrons. Thus, gadolinium provides a means of controlling the local power and global reactivity of a nuclear reactor as a function of cycle exposure. Note, however, that gadolinium depletes or "burns out" over operational time.

As discussed above, each of FIGS. 6-10 (and FIGS. 13-15 to be discussed later herein) illustrate the uranium and/or gadolinium distributions for a fresh bundle design of a 10×10 fuel rod assembly. Displayed are the radial lattices (e.g., typically homogeneous sections of the bundle) at various specified axial (vertical) elevations. As noted with FIGS. 4 and 5, each lattice is a two-dimensional x-y map distribution showing the composition of each fuel rod location (e.g., cells A1-J10). As noted, locations that are designated as "V" indicate that the fuel rod is vanished at that location (i.e. a partial length fuel rod that does not extend the full height of the bundle). Also as noted, locations designated as "E" indicate that the fuel rod is empty (i.e. a space is left in the rod, for example, to accommodate fission gas release). As previously noted, a single number corresponds to the natural (0.71) or enriched $^{235}U$ (>0.71 concentration), while two numbers in a single cell correspond to the uranium (top number) and gadolinium (bottom number) concentrations, respectively.

Fresh bundle design determines the distribution, both axially (vertically) and radially (horizontally), of enriched uranium and/or gadolinium burnable poison within the fuel rods of the fuel bundle. Typical uranium distributions range from natural (0.711 wt. %) to about 5.0 wt. % for a light water reactor. The higher the enrichment, the greater the nuclear fission rate and the power produced by a given fuel rod.

Figure 1:
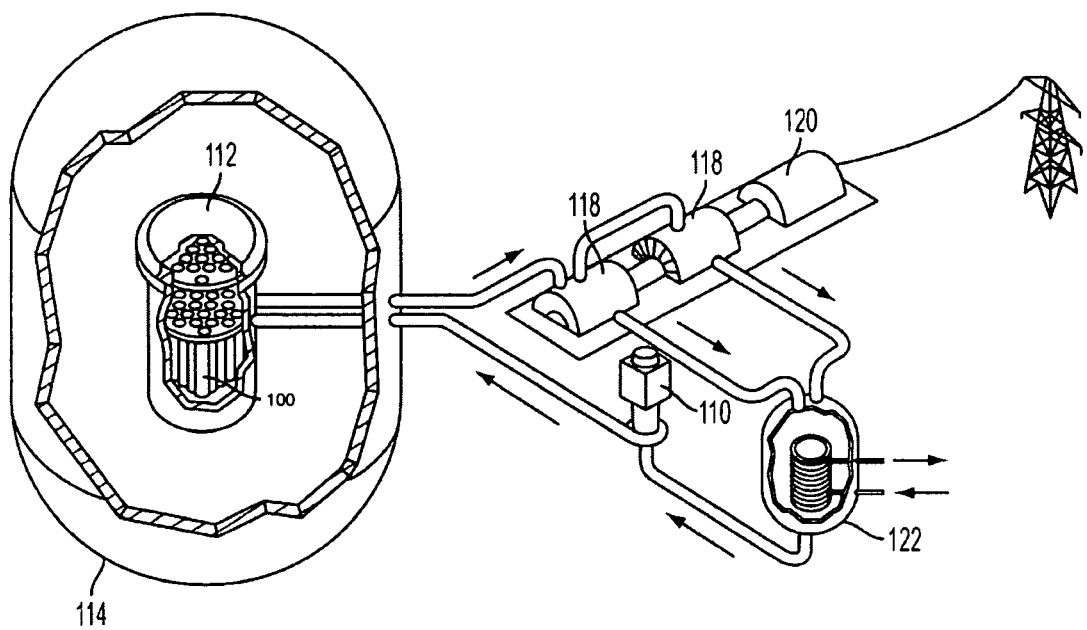
FIG. 1 illustrates a schematic of a conventional boiling water reactor (BWR).
Figure 2:
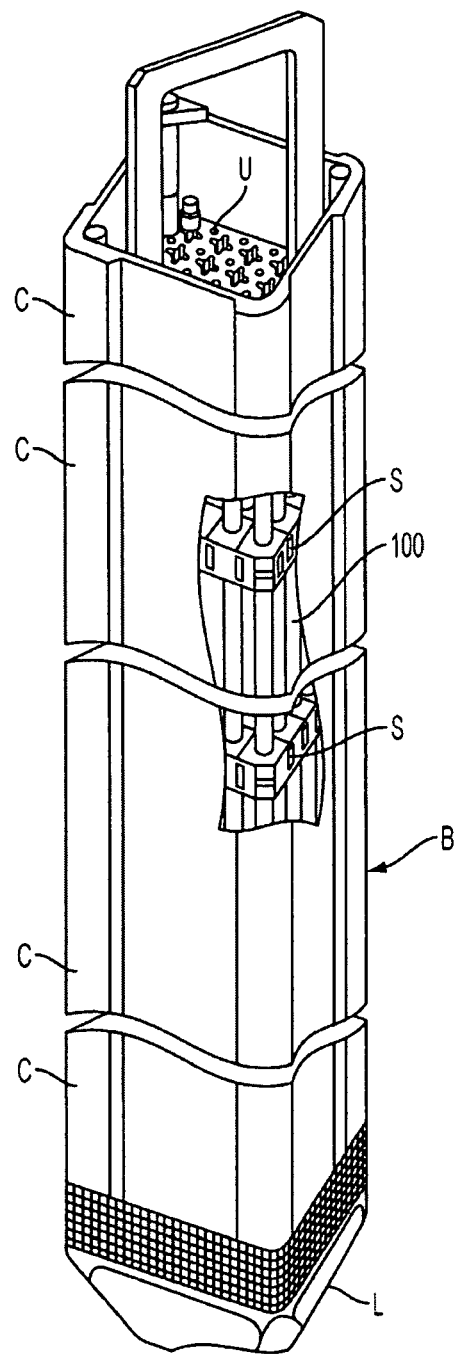
FIG. 2 illustrates a fuel bundle in the core of a reactor vessel.
Figure 3:
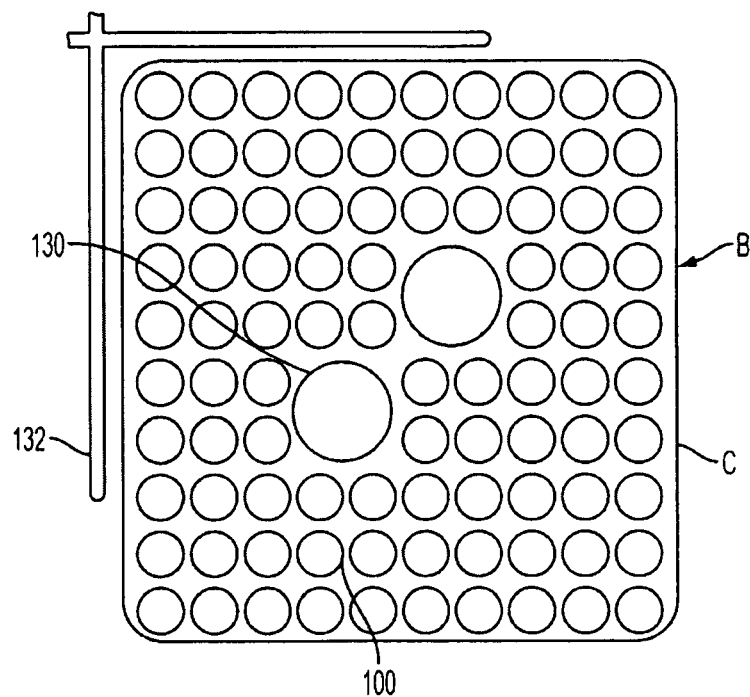
FIG. 3 represents an x-y map distribution of a 10×10 array of fuel rods and water rods in a fuel bundle located in one quadrant of a control blade.

While other time frames may be suitable, a BWR such as illustrated in FIG. 1 operates for a period of typically one, one and a half or two years. The core of the reactor is designed to generate a certain amount of energy measured in gigawatt days per short ton of uranium (GWD/ST). At the completion of a fuel cycle, approximately ¼ to ½ of the least reactive (and typically the most depleted) fuel is removed and replaced with fresh fuel.

A rearrangement of the exposed fuel bundles is also typically performed as a means of maximizing (or improving) the energy production of the core while satisfying thermal and reactivity limits, which are Nuclear Regulatory Commission (NRC) imposed constraints that assure the integrity of the fuel and the safety of the plant. The design of the core loading involves the placement of the exposed fuel bundles as well as the design and placement of the fresh bundles. In addition, a control blade operational strategy (e.g., control blade placements and notch positions) and core flow, as a function of cycle exposure, are also typically determined as part of the design.

Core Simulation Programs

In addition to determining the core loading and control blade operational strategy design, all thermal and reactivity parameters for a given core loading are typically determined via reactor simulation utilizing NRC licensed computer codes, such as the codes TGBLA and PANACEA. These TGBLA and PANACEA codes are well known in the art and are incorporated herein by reference in their entirety. Equivalents of the TGBLA and/or PANACEA codes may be used.

TGBLA models the behavior of a given bundle lattice while PANACEA models the behavior of the bundles (comprised of individual lattices) within the core loading pattern. Reactor simulation also involves assessing the impact of the control blade operational and core flow strategy as a function of cycle exposure.

Thermal Parameters & Limits

Enriched uranium and gadolinium (used as "poison" as one aspect of controlling fission reactions with a nuclear reactor) distributions within the fresh bundle are designed to satisfy thermal and reactivity limits within the core as a function of cycle exposure. Examples of thermal parameters are MFLPD (Maximum Fraction of Limiting Power Density), MAPRAT (the ratio of MAPLHGR or Maximum Average Planar Linear Heat Generation compared to its limit), and MFLCPR (Maximum Fraction of Limiting Critical Power Ratio). Examples of reactivity parameters are cold shutdown margin (CSDM), hot excess reactivity (HOTX) and maximum subcritical banked withdrawal position (MSBWP).

MFLPD may be defined as the maximum of the ratio of local rod power or linear heat generation rate (LHGR) (i.e. kilowatts per unit length) in a given bundle at a given elevation, as compared to the limiting value. MAPLHGR is the maximum average LHGR over the plane in a given bundle at a given elevation. MAPRAT may be understood as the ratio of MAPLHGR to the limiting value.

LHGR limits protect the fuel against the phenomena of fuel cladding plastic strain, fuel pellet centerline melting, and lift-off, which is bulging of the clad exceeding the expansion of the pellet. This is due primarily to fission gas build-up. Lift-off degrades the heat transfer from the pellet across the clad to the coolant.

MAPRAT limits protect the fuel during postulated loss of coolant in an accident while MFLPD limits protect the fuel during normal operation. MFLCPR limits protect the fuel against the phenomena of 'film dryout'. In a BWR heat transfer, a thin film of water on the surface of the fuel rod assures adequate removal of the heat generated in the fuel rod as the water is converted into steam. This mechanism, also known as nucleate boiling, will continue as the power in the fuel rod is increased up until a point known as transition boiling. During transition boiling, heat transfer degrades rapidly leading to the elimination of the thin film and ultimately film dryout, at which time the cladding surface temperature increases rapidly leading to cladding failure.

The critical power of the bundle is the power at which a given fuel bundle achieves film dryout, and is determined from experimental tests. The Critical Power Ratio (CPR) is the ratio of the critical power to the actual bundle power. MFLCPR is simply the maximum over all bundles' of the fraction of each bundles CPR to the limiting value.

Reactivity Parameters & Limits

CSDM is defined as the reactivity margin to the limit for the reactor in a cold state, with all control blades inserted with the exception of the single most reactive control blade. CSDM is determined for each time (exposure) state-point during the cycle. HOTX is defined as the core reactivity for the reactor in the hot state, at rated power, with all control blades removed, at each exposure state-point during the cycle. MSBWP is defined as the maximum notch position, applied to all control blades, at which the core remains in a subcritical state for the reactor in a cold state as a function of cycle exposure.

The MSBWP Reactivity Parameter

Typically, to satisfy the MSBWP parameter condition or limit, it has been an industry standard to use, for example, the x-y map distribution 26874 of FIG. 11 not only between the fuel rod height=144 to 150 inches (node 25), but also between the fuel rod height=138 to 144 inches (node 24). In effect, and referring to FIG. 10, the x-y map distribution at node 24 is changed so that the x-y map distribution 26873 between height=138 to 144 inches is replaced with x-y map distribution 26874. In other words, the x-y map distribution of map 26874 (see FIG. 11) is extended to the top 12 inches of each fuel rod 100 in the bundle B. When such a configuration is used in conjunction with the distribution of x-y map 26868 between the fuel rod height=0 to 6 inches (see FIG. 5, at node 1), a "blanket" of natural uranium is formed in accordance with x-y map 26874 (FIG. 11) at the top 12 inches of the fuel rod 100 and in accordance with x-y map 26868 (FIG. 5) at the bottom 6 inches of the fuel rod 100. While doing so permits satisfaction of the MSBWP limit, the use of the full natural uranium blanket extended at node 24 (between the height=138 and 144 inches) results in more peaked power distributions (i.e. less thermal margin) and adds restrictions on the fuel loading which may require additional fuel bundle design changes in order to satisfy cycle energy requirements.

According to an example embodiment, the MSBWP limit is determined from a reactor simulation utilizing NRC licensed computer codes. In an example, this calculation involves performing a simulation at various cycle exposure statepoints (e.g., from 0 to about 16000 cycle exposures MWd/ST, see FIG. 20), with the reactor in a simulated cold shutdown condition (e.g. 68° F.), and with all control blades inserted at the same notch position. Notch positions are discrete values representing a fraction of total control blade 132 insertion (or withdrawal). In a BWR, the control blades 132 are inserted from the bottom of the core. Thus, for example, notch '0' represents full control blade 132 insertion into the core, notch '24' represents half-way withdrawn, and notch '48' represents the control blade 132 as fully withdrawn from the bottom of the core. These are typically of standard General Electric BWRs. Other notch value representations are possible, such as '0' to '100' as in the ABB or GE Advanced BWR reactor design (representing continuous control blade motion).

Typical notch values for calculating the MSBWP limit would be a notch position at '2' or '4' (for a range of '0' to '48' for a control rod stroke of 144 inches in length), which forms the basis of technical specifications required for plant operation. For a given fuel cycle design, the validity of the MSBWP notch value would be confirmed by performing a series of reactor simulations, and confirming that sufficient reactivity margin existed to assure subcriticality (MSBWP) at cold shutdown conditions.

As discussed above, in a BWR the control blades 132 are inserted from the bottom of the reactor. Thus, a fully inserted control blade 132 represents a blade that completely covers the length of the fuel rods 100 within the bundles B with respect to reactivity control. An MSBWP calculation for a notch value of '2' (over the range of '0' to '48') would place all control blades 132 at axial positions slightly below the top of the active fuel. For a 150 inch length fuel rod 100, this corresponds to 6 inches of uncontrolled fuel at the top. An MSBWP notch value of '4' would eliminate control of the top 12 inches of active fuel, and so on.

Conventional core design practice is to reduce the enrichment in all fuel rods at the top and bottom of the fuel as a means of reducing the fuel cost (e.g., lower enriching or separative work costs) and/or improving neutron economy, e.g., lower neutron leakage). Referred to as axial 'blankets', the top and bottom lattices within the fresh bundle have enrichment distributions that range from natural (0.71) to 2.0 wt. %. As discussed previously, blankets are typically 6 inches at the bottom and 6 or 12 inches at the top, depending on the MSBWP criteria. It is appreciated from the definition of the MSBWP calculation that increasing the height of the top blanket results in increased MSBWP reactivity margin to the MSBWP limit, but conversely may cause undesirable peaked power distributions (i.e. less thermal margin) and additional fuel loading restriction. On the other hand, reducing the height of the top blanket may result in reduced (or lack of) MSBWP reactivity margin.

The conventional art specifies a fixed height of the top blanket (e.g., all natural in all cells of the x-y map distribution such as depicted in map 26868 (FIG. 5), map 26874 (FIG. 11), or map 72017 (FIG. 12), etc.) as being necessary to satisfy the MSBWP reactivity margin (safety condition) requirements. However, by specifying a fixed height of the top blanket (that satisfies MSBWP) prior to the start of the fuel cycle design, the fuel cycle design may be performed in a slightly more constrained manner (from a design freedom perspective) while allowing MSBWP to be ignored, as the fixed height of the top blanket inherently assures that MSBWP is satisfied. The extended length of the top blanket would effectively eliminate MSBWP as an active design constraint, allowing the core designer to focus on other thermal and reactivity parameters such as MFLCPR, MFLPD, CSDM and/or HOTX. In such instances, the MSBWP simulation would be performed only as a validation check once the final design (e.g., with regard to MFLCPR, MFLPD, CSDM and/or HOTX) has been set. However, as the MSBWP reactivity parameter must be accounted for in design analysis, this alternative is not desirable.

For example, a MSBWP notch value of '2' or '4' might require a 12-inch natural blanket for a given fresh bundle design. These correlations would be arrived at based on historical design and operating experience for a given plant. In the example described, a fresh fuel bundle design composed of uranium enrichment and gadolinium distributions would be determined within the constraint of a 12-inch top natural blanket. By specifying a 12-inch top natural blanket, satisfying MSBWP is all but assured.

An alternate approach described herein is to address and incorporate the MSBWP criteria, not by extending the height of the top blanket (across the entire x-y map) but by extending the blanket within only a certain number of fuel rods or fuel rod subsets within a given bundle.

Bundle Design for MSBWP

The proposed approach in accordance with the example embodiments begins by assuming a minimum top axial blanket (at node 24 or 25) for the design. In most cases, this would correspond to 6-inches of top axial blanket at node 25. The fuel cycle design would proceed with determining the exposed fuel placement and fresh fuel placement, the fresh bundle design (consisting of the enriched uranium and gadolinium distributions), and control blade and flow operational strategy. The constraints for the design would consist of each of the limits on the thermal and reactivity parameters, such as MFLCPR, MFLPD, and CSDM, but the design analysis would exclude the constraint on MSBWP.

The details of performing a fuel cycle design in the absence of MSBWP are known in the art and may consist of manual design methods as well as automated optimization techniques. In its basic form, the fuel cycle design process is an iterative process that involves 1) specifying the set of design variables, 2) performing a simulation, 3) evaluating the thermal and reactivity parameters output from the simulation with respect to limits, 4) performing one or multiple design variable changes to address one or more constraint violations and 5) repeating the process of simulation and evaluation until all limits are satisfied while maximizing (or improving) energy production.

As known from experience, certain design variable changes affect certain output parameters. Variable changes may be localized or global in nature. For example, increasing the enrichment in a particular rod of a fresh bundle increases the power in the rod locally, thus increasing MFLPD while at the same time increasing HOTX. In another example, moving the exposed fuel towards the periphery will decrease neutron leakage, and thus increase energy production, albeit at the expense of an increase in power among all bundles located towards the core interior. Combining global with local variable changes allows the designer to achieve the highest degree of optimization while satisfying thermal and reactivity limits.

Upon completion of the fuel cycle design in the absence of the MSBWP criteria, a simulation is performed to determine the reactivity margin (or lack thereof) that exists for the MSBWP calculation. With respect to the simulation, control blades 132 are inserted at the MSBWP technical specification limit with the reactor in a cold state. Several exposure statepoints during the cycle are simulated. Output results may be ASCII text or graphical in nature, for example.

To meet the MSBWP criteria, design variable modifications are performed with respect to the fresh fuel bundle design by extending the top axial zone of selected, individual fuel rods downward to the lattice immediately below the top blanket lattice (at 144 to 150 inches), i.e., to the 12 inch blanket position. An assessment of potential fuel rod modifications may proceed as follows.

First, a list of candidate rod changes is created based on a ranking of enrichments, from lowest enrichment to highest value (corresponding to the lowest to highest ranked rod locations), within the lattice immediately below the top blanket lattice. For example, in the axial view of the rod 100 in FIG. 4, eliminate lattice 26873 (also referenced as x-y map in FIG. 10) and extend lattice 26872 (FIG. 9) up to height 144.0 inches. Referring to lattice 26872 in FIG. 4 and FIG. 9, the first ranked enrichment (from lowest to highest enrichment) would correspond to the upper left corner cell 'A-1' of 1.6 wt %, the second and third ranked enrichments would correspond to the edge cells 'A-2' and 'B-1', etc.

Once the ranked list of rod locations has been determined, the following functions may be performed with respect to the lattice: 1) identify the rod location based on the ranked list, 2)

replace the uranium enrichment and gadolinium in identified location with the top blanket (e.g., x-y map 26874 of FIG. 11) enrichment, 3) perform a core simulation, 3) evaluate the MSBWP reactivity margin output from the simulation, 4) advance to next element of the ranked list and repeat the process of simulation and evaluation until the MSBWP criteria is satisfied for all cell locations.

Accordingly, as described above, an example embodiment is directed to a method of improving the energy generating output of a nuclear reactor containing one or more fuel rods in one or more fuel rod bundles, while satisfying a minimum subcritical bank withdrawal position (MSBWP) safety condition. In the method, rod enrichments at individual fuel rod locations in a axial cross-section of the bundle lattice at the top of the fuel bundle may be ranked, in order from lowest to highest enrichment. The fuel pins of the highest ranked rod location in the lattice may be replaced with pins containing natural uranium, and a core simulation may be performed in order to determine whether there is any margin to a MSBWP reactivity limit.

The replacing and performing functions may be repeated for each lower ranked candidate rod position until no rod location violates the MSBWP reactivity limit, so as to achieve a desired lattice design for the top of the fuel bundle. A reactor core having the fuel bundle(s) configured with the desired lattice design at the top end thereof may then be loaded for eventual reactor operation.

In an example, the fuel bundle includes a 6 inch natural uranium blanket lattice at the top inches of the fuel bundle, and the axial cross section of the fuel bundle lattice being evaluated is a 6-inch lattice segment cross-section of the bundle immediately below the top 6-inch blanket. In an example as described above, the lattice being evaluated may be between 138 to 144 inches from the bottom of the fuel bundle, i.e., the $24^{th}$ node.

The above systematic ranking, replacement and evaluation methodology was applied to certain lattice designs (see FIGS. 12-15) to determine the effect of the lattice design on the MSBWP limit as well as on other thermal and reactivity limits for a fuel cycle design. FIGS. 13-15 illustrate three different lattice designs at the node 24 location for comparison against the conventional full natural uranium blanket lattice design of FIG. 12. FIG. 12 is an x-y map distribution (e.g., 72017) of the lattice cross-section of a fuel rod bundle at a location between height=138 (or >138) to 144 inches, in which all rods of the fuel bundle at this axial location (node 24) have a natural uranium concentration of 0.71. All of the fuel bundle lattices in FIGS. 12-15 have the same fuel rod designs with the exception of the $24^{th}$ node (138-144 inches in the axial position of the rods).

In the alternative lattice designs, FIG. 13 is an x-y map distribution (e.g., 70017) of the lattice cross-section of a fuel rod bundle at a location between height=138 (or >138) to 144 inches, in which 33% of the bundle at node 24 is natural uranium, the remainder enriched uranium. FIG. 14 shows an x-y map distribution (e.g., 73017) of the lattice cross-section of a fuel rod bundle at a location between height=138 (or >138) to 144 inches, in which 24% of the bundle at this node 24 is natural uranium, with the remainder enriched uranium. FIG. 15 shows another x-y map distribution (e.g., 75017) of the lattice cross-section of a fuel rod bundle at a location between height=138 (or >138) to 144 inches, in which 0% of the bundle at this location is natural uranium; this represents a fully enriched uranium node. As will be seen by the data gathered from simulations of the lattice designs, the lattice designs of FIGS. 13-15 had a favorable impact on various thermal and reactivity parameters considered, as compared to the conventional full blanket case of FIG. 12.

Figure 16:
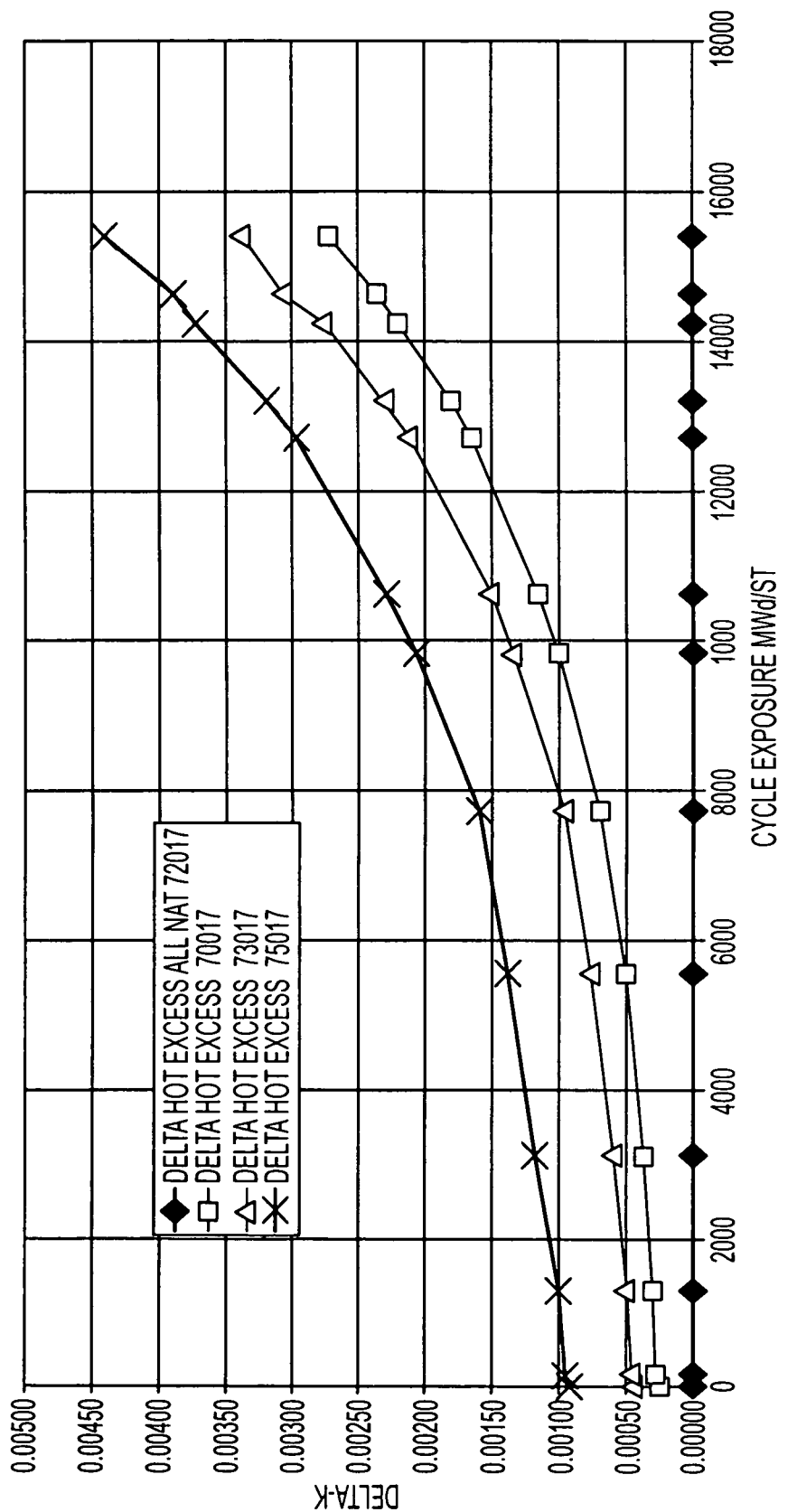
FIG. 16 is a graph of hot excess reactivity for the four fuel bundle lattice designs illustrated in FIGS. 12-15.

FIG. 16 is a graph of hot excess reactivity for the four fuel bundle lattice designs illustrated in FIGS. 12-15. FIG. 16 shows a plot of Delta-K (change in core average hot excess, or HOTX) versus cycle exposure in terms of mega watt days per short ton (MWd/ST) for four different fuel bundle lattice designs shown at node 24 (138-144") in FIGS. 12-15. A change in Delta-K of 0.001 corresponds to a change of 100 MWd/ST. The simulation used was conducted based on the TGBLA code for generating nuclear cross sections and used the PANACEA core simulation software.

The data used to plot the curves in FIG. 16 corresponds to the control blade 132 being between notch '2' (144 inches) and notch '4' (138 inches). Thus, there is shown delta HOTX curves corresponding to FIG. 12 (78 fuel rods natural (0.71 wt. % $^{235}$U) at node 24 except where noted by V (vacant) and water rods); FIG. 13 (26 rods natural, all others enriched at node 24 except as noted by V or water rods); FIG. 14 (19 rods natural, all other rods enriched at node 24 or otherwise V or water rods); and FIG. 15 (0 rods natural, this is the fully enriched bundle (0.71 wt. % $^{235}$U)) when placed between height=138 to 144.

The impact on cycle energy can be seen by comparing the change in HOTX for the various lattices in FIGS. 12-15. As shown in FIG. 16, an increase in HOTX of greater than 0.03 Delta-K is possible with the alternative lattices designs in FIGS. 13-15, relative to the full blanket extension of FIG. 12, which may translate into several weeks of additional energy for the selected bundle design.

Figure 17:
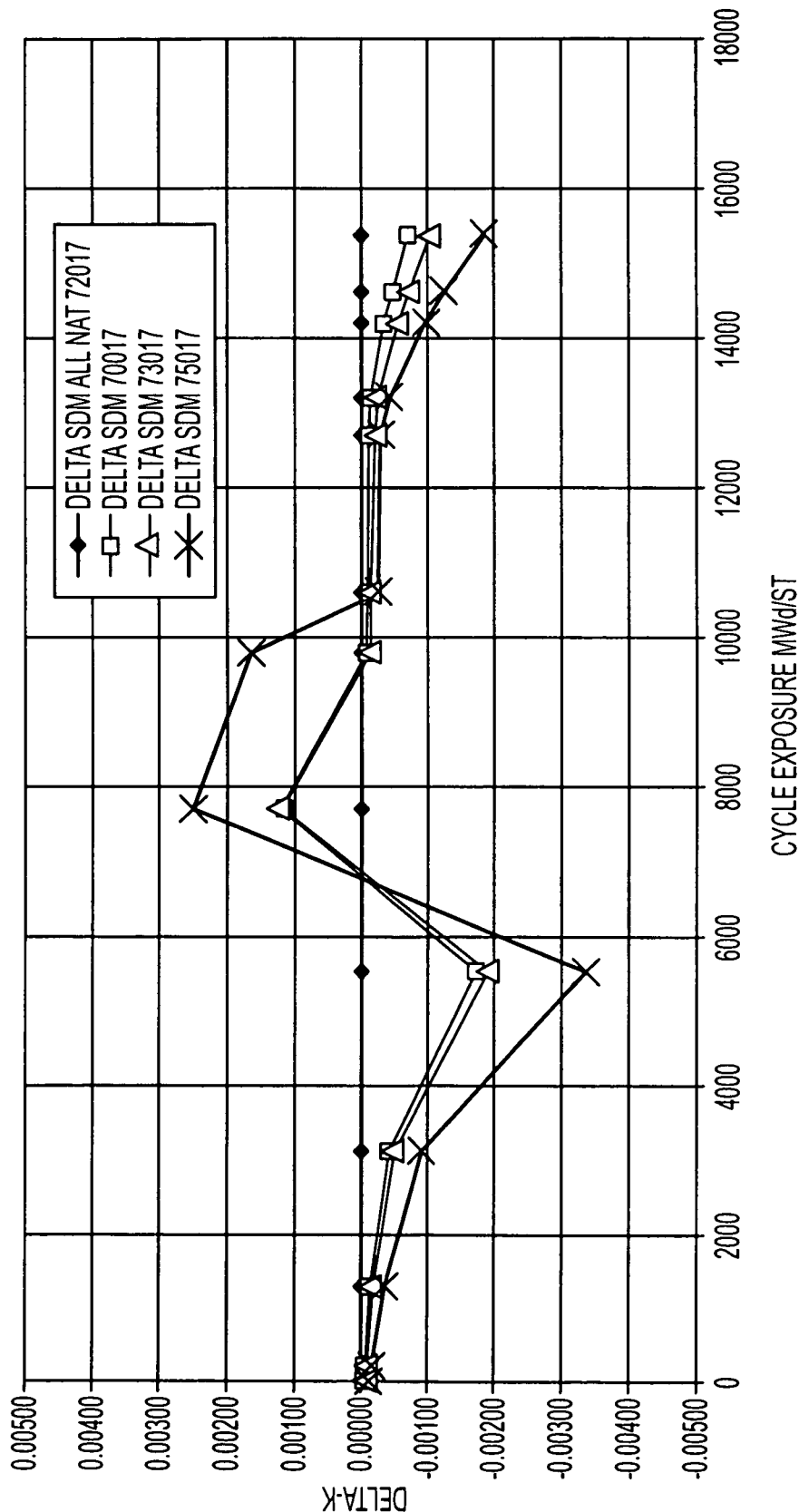
FIG. 17 is a graph of cold shutdown margin (CSDM) for the four fuel bundle lattices designs illustrated in FIGS. 12-15.

FIG. 17 is a graph of cold shutdown margin (CSDM) for the four fuel bundles illustrated in FIGS. 12-15. FIG. 17 is a plot of Delta-K (change in CSDM versus cycle exposure in terms of mega watt days per short ton (MWd/ST) for the four different fuel bundles shown in FIGS. 12-15 (e.g., 72017; 70017; 73017; and 75017) when placed between height=138 to 144 inches corresponding to node 24, or between notch '2' (144 inches) and notch '4' (138 inches). The simulation used was based on the TGBLA code for generating nuclear cross sections and used the PANACEA core simulation software.

As can be seen from FIG. 17, the impact on CSDM of using a partially-enriched or fully enriched bundle cross section at node 24 in the various lattices of FIGS. 13-15, as compared to the present case lattice design at node 24 in FIG. 12, is slight. The variation in CSDM shows a worst case variation of ±0.002 Delta-K over the cycle (for the x-y map distribution of FIG. 15). This represents a minimal impact on CSDM.

Figure 18:
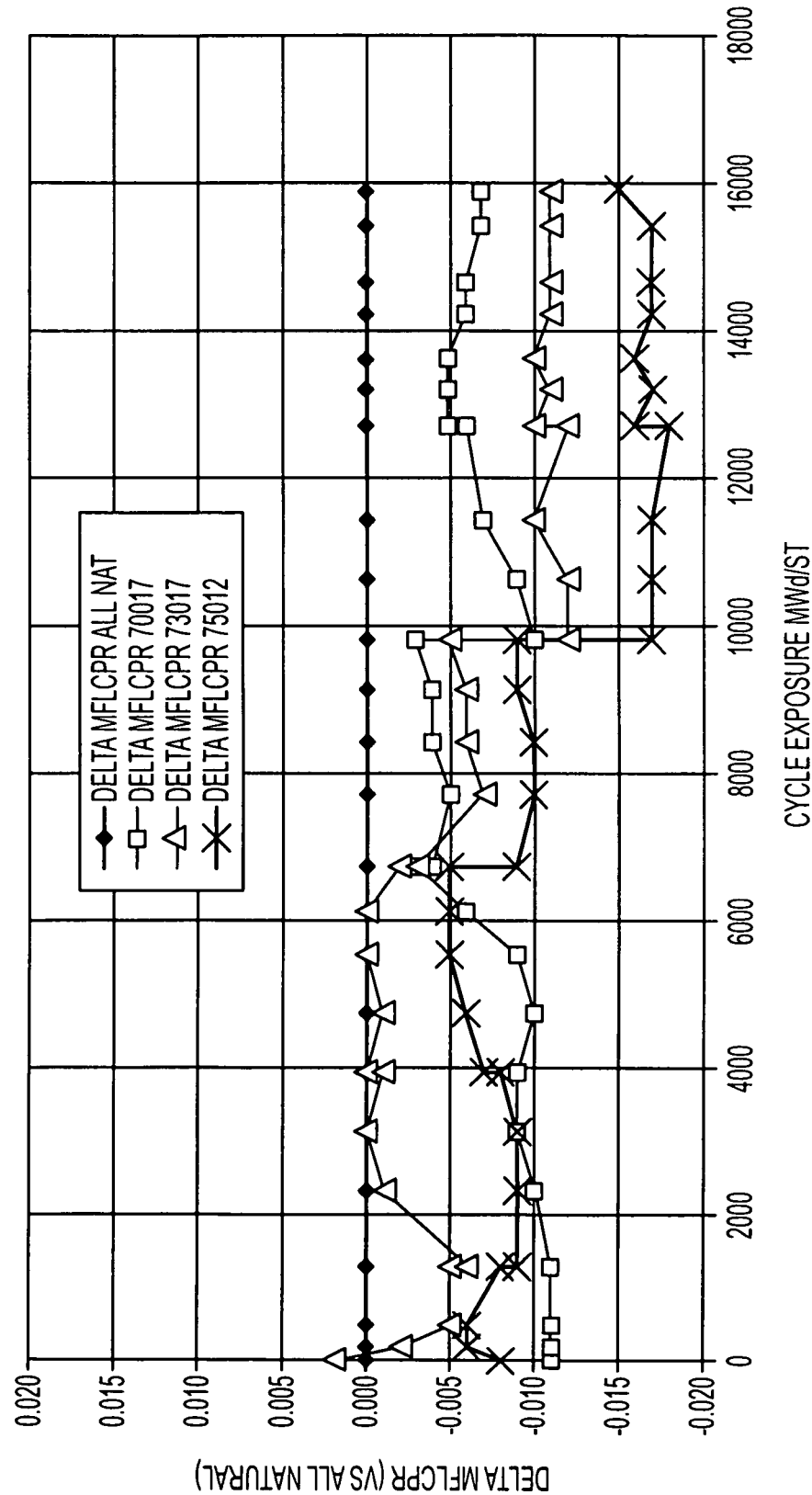
FIG. 18 is a graph of MFLCPR impact on core loading for the four fuel bundle lattice designs illustrated in FIGS. 12-15.

FIG. 18 is a graph of MFLCPR impact on core loading for the four fuel bundle lattice designs illustrated in FIGS. 12-15. FIG. 18 shows a plot of Delta MFLCPR (change in maximum fraction of limiting critical power ratio) versus cycle exposure in terms of MWd/ST for the four different fuel bundle lattice designs of FIGS. 12-15 (e.g., 72017; 70017; 73017; and 75017) when placed between height=138 to 144 inches corresponding to notch '2' (144 inches) and notch '4' (138 inches). The simulation used was based on the TGBLA code for generating nuclear cross sections and used the PANACEA core simulation software. FIG. 18 actually shows improvement as to the margin available to the thermal parameter MFLCPR, as compared to the conventional lattice design at node 24 shown in FIG. 12. FIG. 18 shows an additional margin between 0.007 and 0.015 at the end of the cycle for the lattice designs in FIGS. 13-15.

Figure 19:
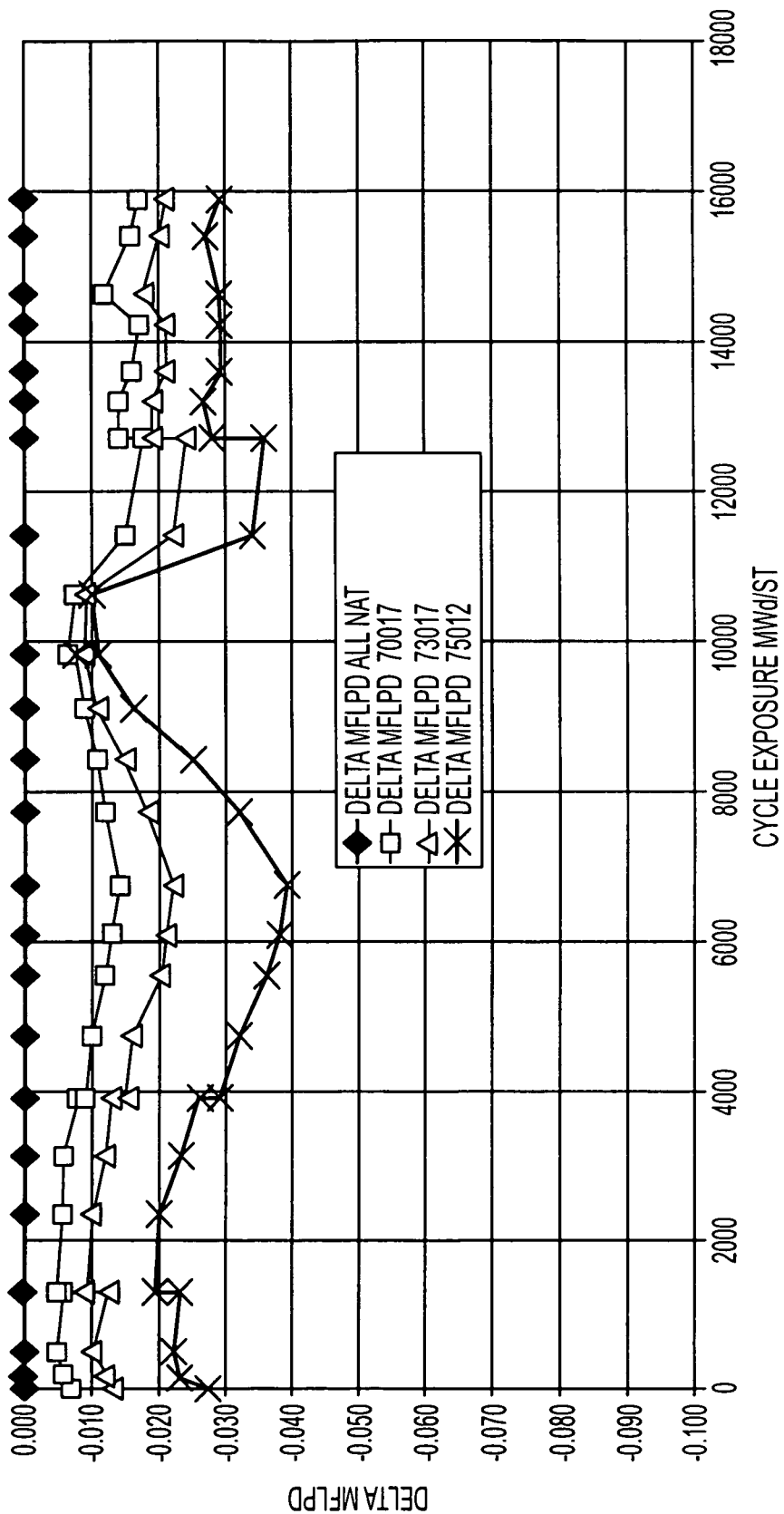
FIG. 19 is a graph of MFLPD impact on core loading for the four fuel bundle lattice designs illustrated in FIGS. 12-15.

FIG. 19 is a graph of MFLPD impact on core loading for the four fuel bundle lattice designs illustrated in FIGS. 12-15. FIG. 19 shows a plot of cycle exposure in terms of MWd/ST versus Delta MFLPD (change in maximum fraction of limiting power density) for the four different fuel bundle lattice designs shown in FIGS. 12-15 (e.g., 72017; 70017; 73017; and 75017) when placed between height=138 to 144 inches corresponding to between notch '2' (144 inches) and notch '4' (138 inches). The simulation was based on the TGBLA code for generating nuclear cross sections and employed the PANACEA core simulation software.

FIG. 19 also shows improvement as to the margin available to the thermal parameter MFLPD for the lattice designs in FIGS. 13-15, as compared to the conventional lattice design at the $24^{th}$ node, as shown in FIG. 12. FIG. 19 shows an additional margin between about 0.018 and 0.029 at the end of the cycle for the lattice designs in FIGS. 13-15.

Figure 20:
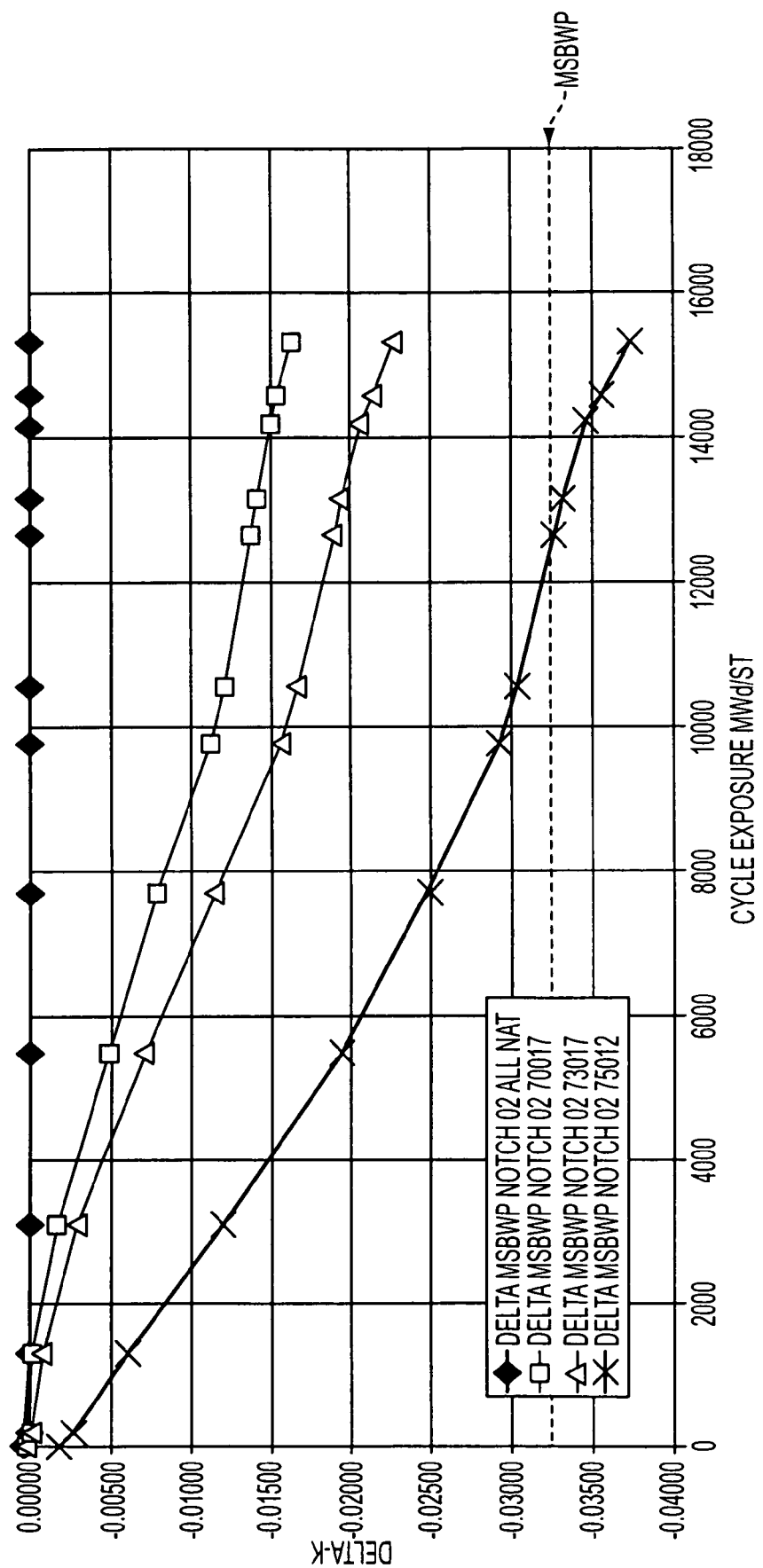
FIG. 20 is a graph of impact on MSBWP for the four fuel bundle lattice designs illustrated in FIGS. 12-15.

FIG. 20 is a graph of impact on MSBWP for the four fuel bundle lattice designs illustrated in FIGS. 12-15. FIG. 20 shows a plot of Delta K (change in maximum subcritical banked withdrawal position (MSBWP)) versus cycle exposure in terms of MWd/ST for the four different fuel bundle lattice designs at node 24 in FIGS. 12-15 (e.g., 72017; 70017; 73017; and 75017) when placed between height=138 to 144 inches corresponding to between notch '2' (144 inches) and notch '4' (138 inches). The simulation was based on the TGBLA code for generating nuclear cross sections and used the PANACEA core simulation software.

The impact on the MSBWP can be readily seen in FIG. 20 for various stages of the example design process. In FIG. 20, comparisons of the lattices in FIGS. 13-15 are made against the full blanket extension as shown in the lattice design of FIG. 12. For a required MSBWP reactivity margin, for example, set at −0.0325 Delta-K (see dashed line marking MSBWP in FIG. 20), relative to the full blanket extension, there exist many possible designs that satisfy MSBWP, with only a subset of fuel rods in a given lattice design at the top of the core (between 138 and 150 inches) having an extended blanket (12 inch blanket) versus all fuel rods having an extended 12 inch blanket at nodes 24 and 25.

For example, when Delta-K is set at −0.0325 for MSBWP, enrichment of $^{235}$U at the $24^{th}$ node (height=138 to 144 inches), the MSBWP safety condition is satisfied for the entire cycle by x-y maps 70017 (FIG. 13), 73017 (FIG. 14) and up to about 12000 cycles for the fully enriched map 75017 (FIG. 15) as indicated in FIG. 20. As in the other simulations for FIGS. 16-19, the control blades 132 are inserted up to notch=2 (all except the top six inches of the fuel rod(s)). In other words, variations of the top blanket between 138 to 144 inches (e.g., enrichment greater than the all natural uranium blanket shown in x-y map 72017 of FIG. 12) may be used to improve energy output, while still satisfying the MSBWP condition.

Upon meeting the MSBWP criteria, a number of changes within the enrichment distribution of the second to top lattice (nodes 24 and 25) will have been made and identified. In contrast to the conventional art, this number of changes corresponds to a small subset of fuel rods within the blanket lattice, versus a wholesale change of all fuel rods within the lattice (i.e. a complete extension downward of the top axial blanket).

Natural Uranium Blanket Determination-Top End of Bundle

In light of the above, it is possible to determine the blanket at the top end of the bundle on a rod location-by-rod location basis. In an example, this may be done by comparing the rod enrichments in the 24th and/or 25th nodes to some threshold rod enrichment value. In an example, this enrichment may equal the enrichment of natural uranium (0.71). As an example, rod enrichments in all fuel rod locations in the bundle at an axial location that represents a cross-section of the top six inches of the bundle may be evaluated against the rod enrichment threshold. For those rod locations having an enrichment exceeding the rod enrichment concentration threshold, a 6-inch blanket of natural uranium may be provided. Those rod locations having an enrichment less than or equal to the rod enrichment concentration threshold would have a 12-inch segment of natural uranium therein; a 12-inch blanket.

Since most of the low enrichment fuel rods are clustered in vicinity of the control blades 132, such a change would result in relatively small changes in thermal margins, exposure capabilities and HOTX results, while potentially having a dramatic effect on the results of calculations for the MSBWP limit.

It follows that the example embodiments additionally provide a fuel bundle of a nuclear reactor that is configured to have a variable natural uranium blanket at a top end thereof. The fuel bundle may include a six-inch natural uranium blanket at a bottom end of the bundle. Selectable rod locations at an axial cross-section at a top end of the bundle having fuel rod enrichments which exceed a rod enrichment threshold value are provided with a six-inch natural uranium blanket therein. Those selectable rod locations in the axial cross-section having fuel rod enrichments which are less than or equal to the rod enrichment threshold value may be provided with a twelve-inch natural uranium blanket therein. As discussed above, each rod location is evaluated so as to satisfy a MSBWP reactivity limit within an acceptable margin thereto.

The following additional example embodiment is also, provided, directed to a method for improving the energy generating output of a nuclear reactor containing one or more fuel rods in one or more fuel rod bundles while satisfying a safety condition. This example method may include (a) simulating the variation of enrichment in one or more fuel rods in one or more fuel rod bundles with fissionable material at a selected axial (vertical) region and a selected radial (horizontal) region of the fuel rod and fuel rod bundle; and (b) calculating if the safety condition is satisfied, Steps (a) and (b) can be repeated until the highest enrichment level of fissionable material (or substantially highest enrichment level) in one or more fuel rods in one or more fuel bundles is identified which still satisfies the safety condition. An indication of the highest enrichment level (or substantially highest enrichment level) that satisfies the safety condition can then be output to a user or designer.

In the above noted additional embodiment, the fissionable material may be $^{235}$U or an equivalent thereof. Also, the safety condition may be the MSBWP safety condition. The selected axial region may be at a height between about 0 inches and 150 inches of the one or more fuel rods in the one or more fuel bundles. Other suitable axial regions may be at a height between 0 and 6 inches, between 138 and 144 inches and/or between 144 and 150 inches measured from the bottom of the fuel rod(s). According to another embodiment, the above-noted method may also include the step (e) of causing the one or more fuel rods in one or more fuel rod bundles to be enriched above natural (e.g., above about 0.71% by weight $^{235}$U) and up to and/or including the highest or substantially highest enrichment level identified in step (c) which satisfies the safety condition (e.g., MSBWP safety condition).

The exemplary embodiments being thus described, it will be obvious that the same may be varied in many ways. Such variations are not to be regarded as departure from the exemplary embodiments, and all such modifications as would be obvious to one skilled in the art are intended to be included within the scope of the appended claims.

What is claimed is:

1. A method for improving the energy generating output of a nuclear reactor while satisfying a maximum subcritical banked withdrawal position (MSBWP) reactivity limit, comprising:

ranking enrichments of individual fuel rods by evaluating an uranium enrichment of fuel rods at a two top-most nodes of each fuel rod of a fuel bundle, a highest ranked fuel rod being a fuel rod with the lowest enrichment of uranium at said two top-most nodes, the evaluation of the two top-most nodes being performed by discounting existence of any natural uranium blanket, replacing a highest ranked fuel rod with a fuel rod containing natural uranium in either the top node, or the two top-most nodes, performing a core simulation to determine whether there is any margin to a MSBWP reactivity limit, repeating the replacing and performing function for each lower ranked fuel rod until no fuel rods violate the MSBWP reactivity limit, so as to achieve a desired lattice design for the top of the fuel bundle, and operating the core of the reactor having fuel bundles configured with the desired lattice design at the top of the fuel bundle.

2. The method of claim 1, wherein the top node of each fuel rod in the fuel bundle is natural uranium, thereby providing the fuel bundle with a 6-inch natural uranium blanket at the top of the fuel bundle.

3. The method of claim 1, wherein the two top-most nodes of the fuel rods of the fuel bundle are between 138 and 150 inches from the bottom of the fuel bundle, and the top-most node between 144 and 150 inches from the bottom of the fuel bundle is natural uranium.

4. The method of claim 1, wherein the top-most node is located between 144 and 150 inches from the bottom of the fuel bundle, and a lower of the two top-most nodes is located between 138 and 144 inches from the bottom of the fuel bundle.

* * * * *